No. 671,357. Patented Apr. 2, 1901.
C. E. STROUSE.
REPAIR TOOL FOR ELASTIC TIRES.
(Application filed Jan. 14, 1901.)
(No Model.)
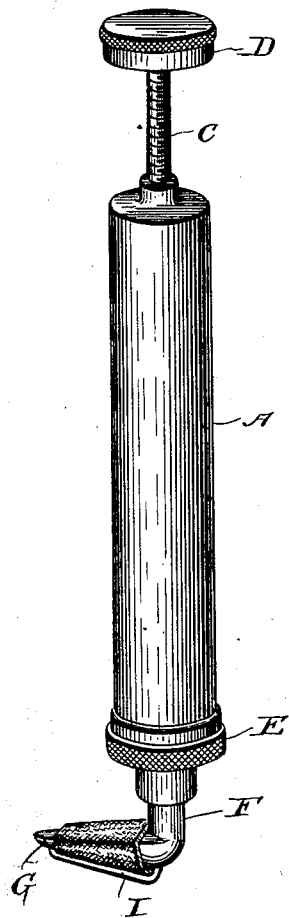
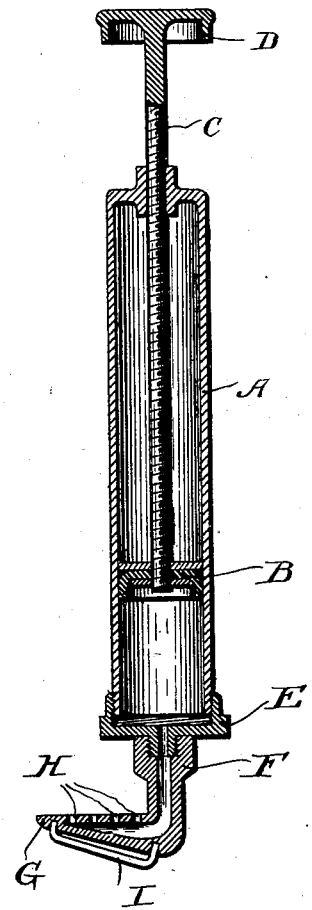
Inventor
C. E. Strouse

UNITED STATES PATENT OFFICE.

CHARLES E. STROUSE, OF MONTGOMERY, PENNSYLVANIA.

REPAIR-TOOL FOR ELASTIC TIRES.

SPECIFICATION forming part of Letters Patent No. 671,357, dated April 2, 1901.

Application filed January 14, 1901. Serial No. 43,156. (No model.)

*To all whom it may concern:*

Be it known that I, CHARLES E. STROUSE, a citizen of the United States, residing at Montgomery, in the county of Lycoming and State of Pennsylvania, have invented certain new and useful Improvements in Repair-Tools for Elastic Tubing; and I do declare the following to be a full, clear, and exact description of the invention, such as will enable others skilled in the art to which it appertains to make and use the same.

The invention relates to repair-tools for elastic tubing—such, for instance, as a hose-pipe or pneumatic tire.

The object of the invention is to provide a tool of this character by means of which that portion of the inner wall of the tube immediately surrounding a puncture or a cut may be cleansed preparatory to applying the adhesive agent used in repairing the tire and which may also be used for applying the adhesive agent after the tire has been thoroughly cleansed.

In preparing a tire preparatory to plugging or vulcanizing it it is first absolutely essential to thoroughly cleanse the inside of the tire immediately around the hole with some cleansing agent, usually benzin, to remove soapstone and other foreign matter generally found inside a tire and which must be removed before the tire can be successfully repaired, for the reason that rubber-cement, which is the usual adhesive agent employed for repairing, will not adhere where there is a particle of foreign substance to conflict. This cleansing preparatory to repairing is now generally done with a cloth wrapped about a thin piece of wire, which cloth is saturated with benzin and inserted into the tire through the puncture or hole therein. This mode is objectionable, for the reason that the walls of the hole or puncture tend to squeeze the benzin from the cloth as it is being inserted through the hole or puncture, so that after the tool has been properly inserted within the tire but little benzin is left on the cloth with which to cleanse the tire. The present invention overcomes this objection; and it consists of certain novel features of construction, combination, and arrangement of parts, which will be hereinafter more fully described, and particularly pointed out in the appended claims.

In the accompanying drawings, Figure 1 is a perspective view of my improved tool, showing it equipped for cleansing the interior wall immediately surrounding a hole or puncture in an elastic tube. Fig. 2 is a longitudinal vertical sectional view with the swab removed.

In the drawings, A denotes the barrel of a pump or syringe, having the usual piston B, piston-rod C, and handle D. The piston-rod is made screw-threaded, as shown, so that the piston can be moved slowly to force the contents from the barrel by revolving the rod. The outer end of the barrel is provided with a removable cap E, having a nozzle F, formed with a beak G, which extends at right angles from the nozzle and has a flat inner face formed with discharge-orifices H. The outer face of the beak is provided with a swab-holder I, which preferably consists of a wire bent into bail form and having its ends secured to the beak in any suitable manner.

When the device is to be used for cleansing the inner wall of a tube immediately surrounding a rent or puncture, a swab, which may consist of a tape, is wrapped around the beak and threaded through the holder and thus held properly in place. The barrel is filled with benzin or an equivalent cleansing agent and the cap screwed upon the outer end of the barrel. The beak and nozzle are now inserted into the tube through the puncture or rent therein, and a small quantity of benzin is forced out through the discharge-perforations of the beak and thoroughly saturates the swab. The tool is now rotated several times by the hand, thus rotating the beak inside the tire, and while being rotated the beak is drawn firmly against the tire, thus pressing the swab firmly against that portion of the tire immediately surrounding the rent or puncture and thoroughly cleansing the same of soapstone and other objectionable foreign matter, and thus properly preparing the tire for repair. After the tire has been properly prepared in the manner set forth the same tool may be used for injecting the adhesive agent or cement into the tire preparatory to the insertion of the plug, the only change required being the removal of the swab from the beak. In applying the cement the tool is operated in the same manner as in applying the cleansing agent, and a further description on this point is not thought to be necessary.

From the foregoing description, taken in connection with the accompanying drawings, the construction and mode of operation of my improved tool will be readily understood without requiring a more extended explanation.

Various changes in the form, proportion, and minor details of construction may be made within the scope of the invention without departing from the spirit or sacrificing any of the advantages thereof.

Having thus described my invention, what I claim, and desire to secure by Letters Patent, is—

1. In a tool of the character described, the combination, with a barrel, a piston and a piston-rod, of a nozzle secured to one end of the barrel and provided with a beak which extends at an angle to the nozzle and has a flat inner face provided with a vertical row of discharge-perforations, and a swab-holder carried by said beak, substantially as set forth.

2. In a tool of the character described, the combination, with a barrel, a piston and a piston-rod, of a nozzle secured to one end of the barrel and provided with a beak which extends at an angle to the nozzle and has a flat inner face provided with a vertical row of discharge-perforations, a swab-holder carried by said beak, and a swab carried by said swab-holder, substantially as set forth.

In testimony whereof I have hereunto set my hand in presence of two subscribing witnesses.

CHARLES E. STROUSE.

Witnesses:
 B. M. KILMER,
 S. J. BARDO.